July 10, 1928.　　　　　　　　　　　　　　　　　　1,676,341
T. LUND
BLANK ASSEMBLING MACHINE
Filed Nov. 19, 1920　　　5 Sheets-Sheet 1

INVENTOR:
Thomas Lund
By his Attorney

July 10, 1928.

T. LUND

BLANK ASSEMBLING MACHINE

Filed Nov. 19, 1920    5 Sheets-Sheet 3

INVENTOR
Thomas Lund
By his Attorney,
Nelson M Howard

July 10, 1928.
T. LUND
BLANK ASSEMBLING MACHINE
Filed Nov. 19, 1920
1,676,341
5 Sheets-Sheet 4
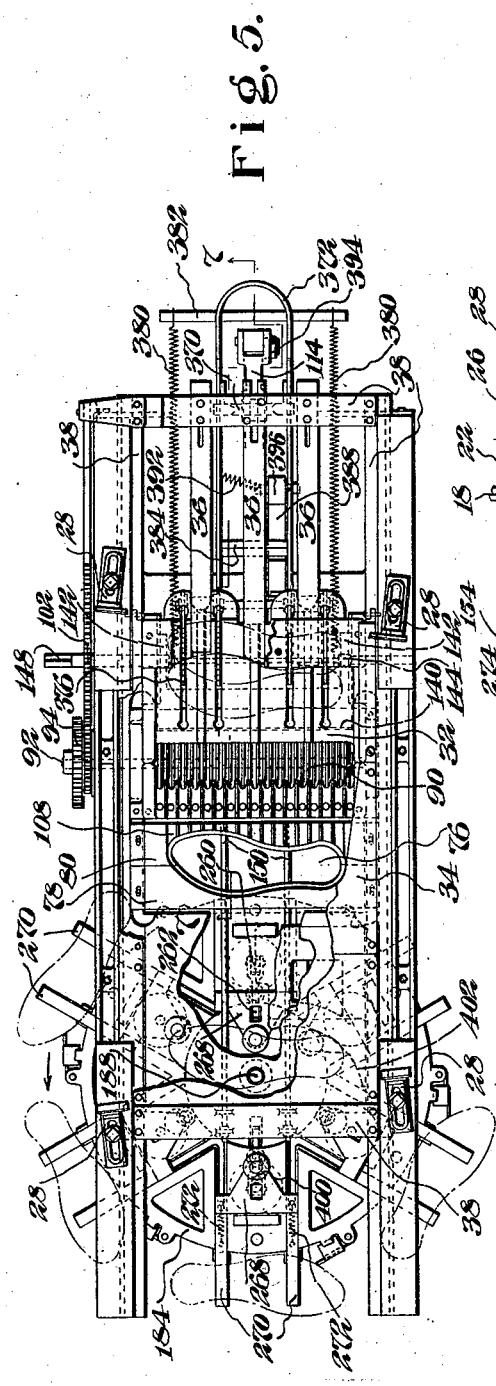
Fig. 5.
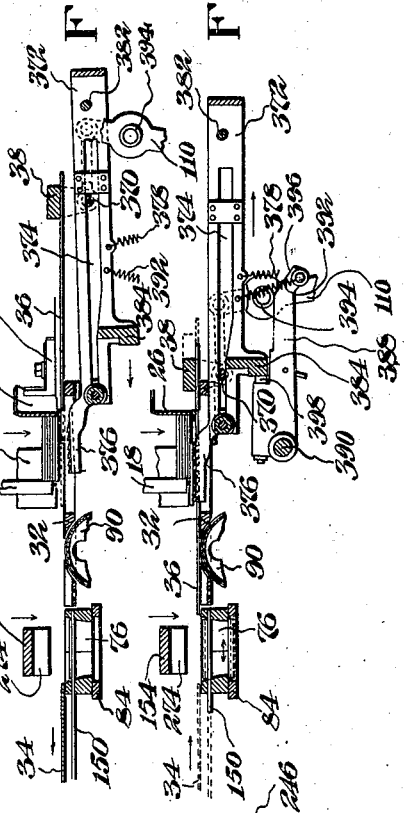
Fig. 7.
Fig. 8.
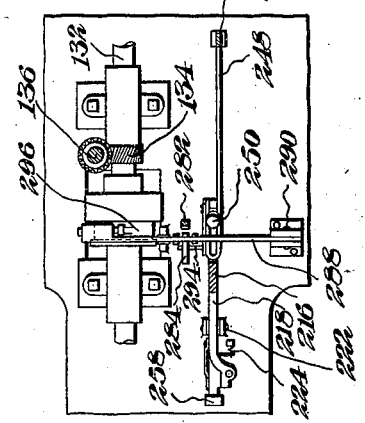
Fig. 6.
INVENTOR:
Thomas Lund
By his Attorney,
Nelson M. Howard Patented July 10, 1928.

1,676,341

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

BLANK-ASSEMBLING MACHINE.

Application filed November 19, 1920. Serial No. 425,161.

This invention relates to blank assembling machines, and, more particularly, to machines for superposing and assembling pieces of sheet material to produce laminated blanks.

The object in view is to produce an improved automatic machine for manufacturing articles assembled from pieces of sheet material, although the utility of certain features of the invention is not restricted to a completely automatic machine, since they might advantageously be used in machines only partly automatic in their operation.

The illustrative machine, embodying the invention, which is shown in the accompanying drawings and hereinafter described in detail, is a machine which has proved satisfactory in actual practice in the manufacture of composite insoles, each consisting of a layer of leatherboard and a thin layer of leather, the two layers being secured together by paste or cement. It is obvious, however, that by mere changes in form and proportion of the parts, machines embodying the invention could be used in the manufacture of blanks of other specific forms. For example, such machines might be used in assembling outsoles with slip soles or taps, in the manufacture of heel blanks and in the manufacture of many other forms of laminated blanks and articles.

With the above outlined object in view an important feature of the invention resides in an organized machine in which are combined blank assembling mechanism and improved mechanism for stacking the manufactured blanks as they are produced and holding them in stacks or columns under pressure until the adhesive used to secure the layers together has set or dried.

Another feature of the invention consists in improved blank holding and pressing mechanism comprising a rotary turret carrying a plurality of holder units in which the blanks are successively accumulated progressively in stacks, one or more of such stacks being kept under pressure while succeeding stacks of blanks are being accumulated and the blanks finally being discharged one stack at a time from the machine after they have been under pressure sufficiently long to allow the adhesive to become set.

Another feature of the invention resides in the combination of an expansible blank assembling form, through which blanks are pressed in the process of assembling them, with means for exerting a reverse pressure upon the assembled blank against the reverse face of the form to produce a secure adhesion between the layers of the blank around its edges.

These and other valuable features of the invention will be more fully understood from the following detailed description when read in connection with the accompanying drawings, in which Fig. 1 is mainly a vertical, longitudinal central section of the machine with certain parts of the operating mechanism shown in elevation;

Fig. 5 is a plan taken upon the line 5—5 of Fig. 1;

Fig. 6 is a plan of a portion of the mechanism taken upon the line 6—6 of Fig. 1;

Figs. 7 and 8 are sections taken upon the line 7—7 of Fig. 5, showing the parts in different operating positions;

Figures 1, 10:
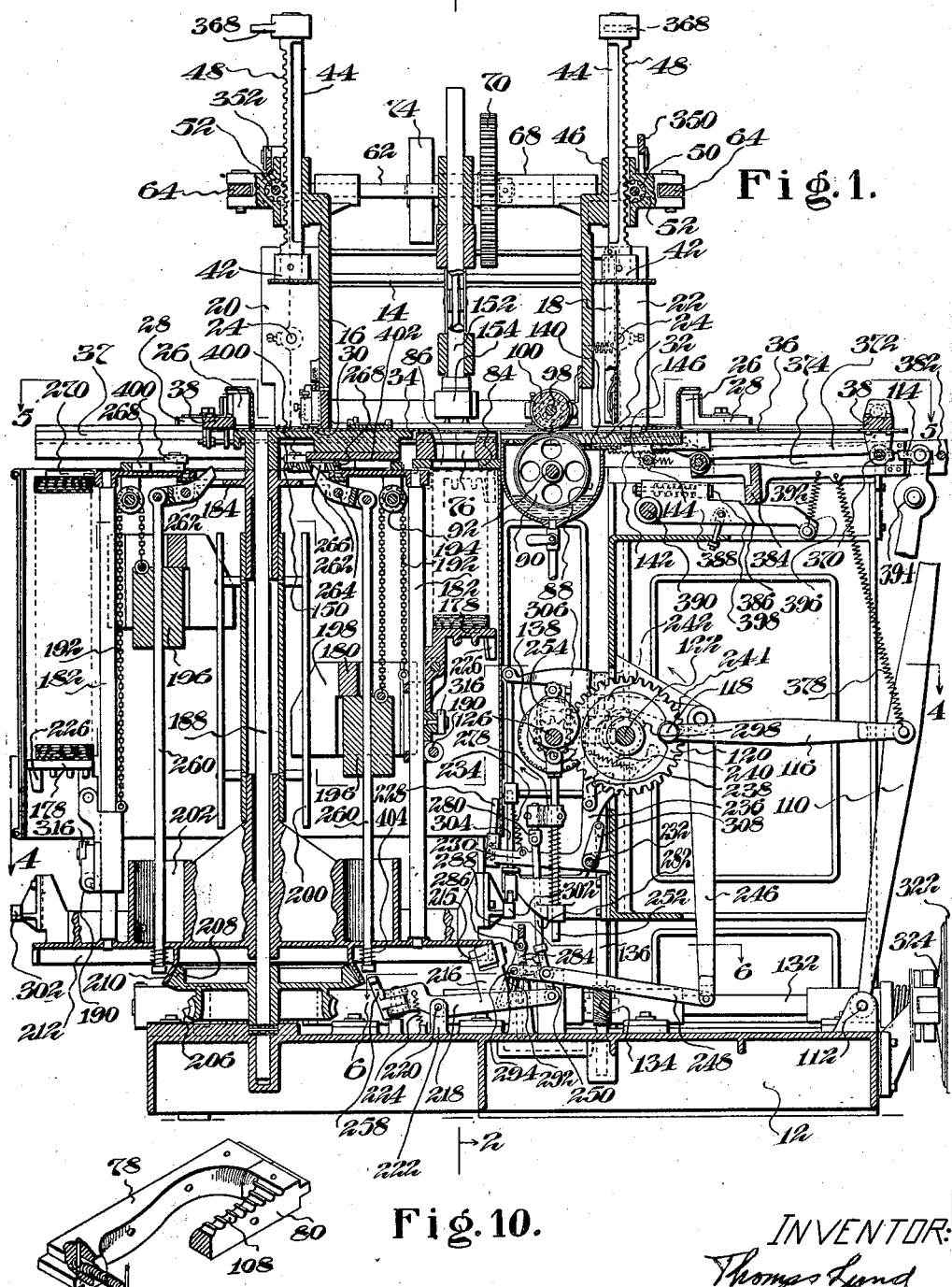
Fig. 10 is a perspective view of the mold or form member.

Referring now to the drawings, the various operating parts and mechanisms of the machine are mounted in and upon a base or frame 12. A superstructure 14 provides a support for a pair of blank magazines 16, 18 which, in the particular machine illustrated herein, are designed to contain stacks of sole blanks. The ends of the magazines are formed by upright plates 20, 22, supported by horizontally adjustable rods 24 and the edges of the blanks in the lower portion of the stack are guided into proper blank delivering position by plates 26 carried by adjustable brackets 28 (see Figs. 1 and 5).

The stacks of blanks in the magazines rest upon stationary tables 30, 32 and the lowermost blanks from the magazines are respectively fed out alternately by a pair of pusher plates 34, 36, reciprocating over the tables 30, 32 and beneath the respective magazines. The pushers 34, 36 are secured to and actuated by a sliding frame 38 which extends throughout the greater part of the length of the machine, and reciprocates in guides 37 in the frame 12.

As shown, there are three pusher plates 36, the same being independently adjustable longitudinally of the slide 38 by the provision of bolt and slot connections with the latter, as shown in Fig. 5. It is thus possible to adjust the pushers properly to engage the edges of blanks of various sizes and shapes and to cause them to feed the blanks to the desired place.

In order to keep the blanks in the magazines flat and in a condition to be fed smoothly and with certainty from the magazines, each magazine is provided with a presser foot for exerting downward pressure upon the stack of blanks contained therein. Inasmuch as the presser feet in the two magazines are substantially alike, it will suffice to describe one of them in detail.

Figure 3:
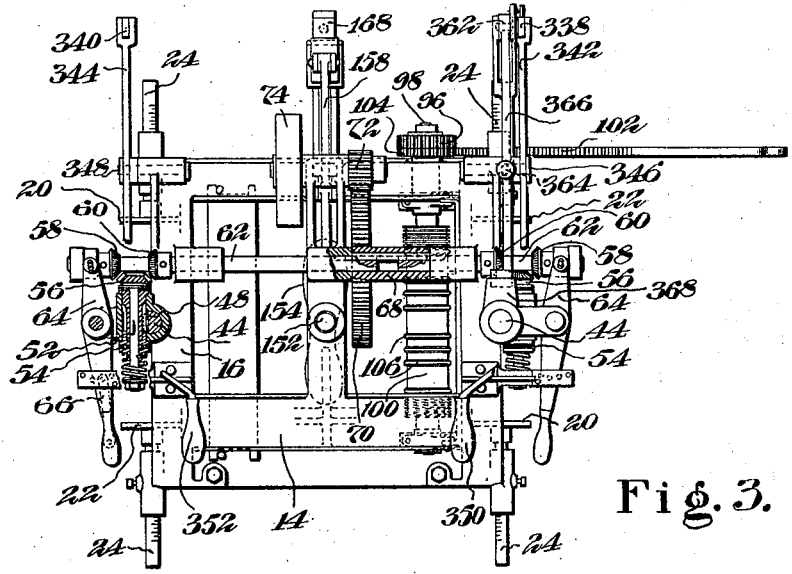
Fig. 3 is a partial plan of the upper portion of the machine.

Referring particularly to Figs. 1 and 3, the presser foot 42 is carried by a plunger 44 guided for vertical movement in a stationary bearing 46. Rack teeth 48 are formed on one side of the plunger and are engaged by a pinion 50, which is frictionally driven by a shaft 52, the frictional connection between the pinion and the shaft being indicated at 54. The shaft 52 carries a miter gear 56 with which may mesh either of a pair of miter gears 58, 60, secured to a horizontal rotary shaft 62. The two shafts 62 are in axial alinement and their adjacent ends enter a sleeve 68 and are splined therein so that, while the shafts may slide longitudinally in the sleeve, they both turn with it. The sleeve 68 carries a driving gear 70 meshing with a pinion 72 which is continuously driven by power applied to a driving pulley 74.

The shafts 62 may be independently moved endwise in their bearings by manually operable levers 64 provided with locking devices 66. Each locking device is arranged to maintain the corresponding lever 64 in any one of three selected positions, namely, with either the gear 58 or the gear 60 in mesh with the gear 56, or in a neutral position where neither of the gears 58, 60 meshes with the gear 56.

It will be understood that the gearing 56, 58, 60 constitutes a driving, stopping, and reversing mechanism for the presser foot 42. For example, the pulley 74 may be driven in such a direction that when the gear 58 is meshed with the gear 56 the plunger 44 shall be moved downwardly, the presser foot 42 exerting continuously a yielding, downward pressure upon the stack of blanks beneath it, by virtue of the frictional connection 54, keeping the blanks flat and in a condition to be fed smoothly and with certainty from the magazine. If it be desired to remove the blanks from the magazine or to insert a fresh supply of blanks, the lever 64 may be moved to the opposite limit of its throw, meshing the gear 60 with the gear 56 and causing the presser foot 42 to be elevated by power. Whenever it is desired to leave the presser foot stationary, the lever 64 may be moved to its intermediate, neutral position, whereupon neither of the gears 58, 60 meshes with the gear 56 and no force is applied to the plunger 44 to move it in either direction.

Midway between the magazines 16, 18 is located a blank assembling form or mold 76 in which the blanks are assembled. This form has an opening of the same shape as the blank and is split into halves 78, 80, which are normally held together by springs 82, permitting the form to expand when necessary. The opening through the form is tapered from the top downwardly and, in at least the lower half of the form, is slightly smaller than the blanks being handled. The form 76 rests upon a plate 84, which is stationary and is provided with an opening 86 of the same shape as the opening in the form 76 but fully as large as, or slightly larger than, the blanks which must pass through it.

The illustrated machine is designed to produce shoe soles, each consisting of a layer of leather and a layer of leatherboard pasted or cemented together. Let it be assumed, for example, that the magazine 16 is supplied with leatherboard blanks and the magazine 18 is supplied with leather blanks. The slide 38 is actuated in first one direction and then the other to produce first a leatherboard blank from the magazine 16, feed it across the table 30 and deposit it in the form 76 and then a leather blank from the magazine 18, feed it through a pasting or cement applying device, presently to be described, and deposit it in the form 76 on top of the leatherboard blank.

The pasting device comprises a paste or cement containing tank 88 in which a paste roll 90 runs. The roll 90 is carried by a shaft 92, upon the end of which is secured a gear 94 which meshes with a gear 96 upon the end of a shaft 98. The shaft 98 carries a roll 100 which presses the blank upon the paste roll and insures that it shall receive an even coating of paste. The paste roll and presser roll are so geared together that they rotate at the same peripheral speed. Their rotation is effected by a rack 102 mounted upon the slide 38 and reciprocating therewith. The rack 102 meshes with a gear 104 loosely mounted upon the shaft 98 but connected by a one-way clutch with the gear 96 so that the paste and presser rolls are rotated during movement of the slide 38 in one direction and not in the other. The presser roll 100 is provided with ridges 106 to minimize the danger of the roll collecting paste and applying the same to the upper side of the blank as the latter is fed through the pasting device. For the same purpose of avoiding the spreading of paste where it is not desired, the upper side of the form section 80 is corrugated, as shown at 108, as is also that portion of the table 32 over which the pasted blank is fed.

A scraper 140, see Fig. 1, is arranged adjacent to the paste roll and is provided with means for adjustment to determine the amount of paste to be applied by the roll. To this end the rack 142, attached to the scraper, meshes with a pinion 144 upon a shaft 146 having a squared end 148, see Fig. 5, to which a key may be applied to adjust the scraper 140 toward or from the paste roll.

Reciprocating motion is imparted to the slide 38 by a lever 110 having one end pivoted to the frame 12 at 112 and the other end connected by a link 114 to the slide. A link 116 connects the lever 110 to a crank pin 118 upon a gear 120 which is mounted upon the shaft 122.

The gear 120 is driven by a pinion 124 upon a shaft 126 which is connected by a Horton clutch 128 to a continuously rotating shaft 130, driven from the main driving shaft 132 of the machine through gearing 134, a vertical shaft 136, and gearing 138.

A pair of horizontal rods 150, carried by the slide 38, are arranged to pass through holes in the sides of the form 76 and are so related to the pusher plate 34 that they occupy a position across the form opening, as shown in Figs. 5 and 7, at the time when the pusher deposits a leatherboard blank in the form. The function of the rods 150 is to support the blank as it is deposited in the form and insure that the blank shall assume a horizontal position before it is pushed down through the form. It will be apparent that, inasmuch as the rods 150 move with the slide 38, they will be retracted with the pusher 34, thus permitting the blank to be pressed down through the form.

In the operation of the machine the slide 38 is first moved toward the right, as viewed in Fig. 1, in which process a leatherboard blank is removed from the magazine 16 and deposited in the form 76, resting upon the rods 150. The slide 38 then moves toward the left, removing a leather blank from the magazine 18, passing it over the paste roll 90 and depositing it in the form upon the previously deposited leatherboard blank. In this movement of the slide 38 toward the left the rods 150 are withdrawn from beneath the blank which, however, does not fall through the form because the blank is slightly larger than the lower part of the form opening. The next thing to occur is the pressing of the blank downwardly through the form opening and this is effected by a plunger 152 having at its lower end a die 154 of substantially the same shape as the form opening but slightly smaller than the latter. This plunger is lowered at the proper time by mechanism which will now be described.

Figure 2:
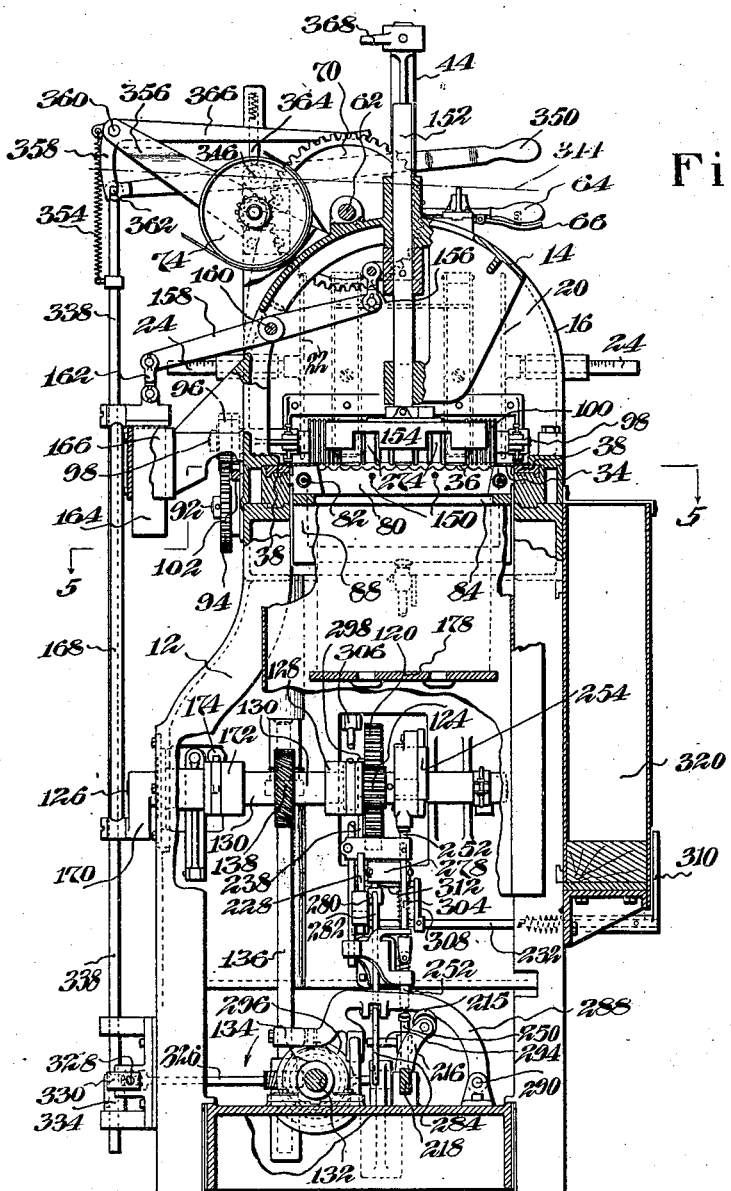
Fig. 2 is a vertical, central cross-section of the machine, the section being taken upon the line 2—2 of Fig. 1.

The plunger 152 is connected by a link 156 to one end of a lever 158 which is pivoted to the machine frame at 160. The opposite end of the lever is connected by a link 162 to a slide 164, which is guided for vertical movement in a stationary bearing 166. The slide 164 is connected by a rod 168 to a crank 170 which may be operatively connected through a Horton clutch 172, see Fig. 2, to the continuously driven shaft 130. The timing of the operation of the plunger 152 and the attached die 154 is thus determined by the engagement and disengagement of the Horton clutch 172. This clutch is under the control of a stop dog 174 resting upon a cam 176 secured to the shaft 122 and designed to engage and release the clutch at the proper times to cause the plunger 152 to descend in proper time relation to the movements of the slide 38, the motion of which is also derived from the shaft 122, as previously described.

As the die 154 descends it presses the assembled sole blank down through the form 76, which expands to permit the blank to pass. Further descent of the die 154 presses the blank firmly upon a shelf or support 178, which is depressed a short distance against the influence of a weight 180. As the die 154 rises, which it does rather suddenly, the support 178 forces the blank upwardly until its marginal portion encounters the under side of the form 76, with something in the nature of a blow, which insures that the two layers of the blank shall be tightly pressed together around the margin.

The support 178 is guided to move freely in a vertical direction upon an upright guide bar 182. The bar 182 is one of six similar bars which are mounted in an upright rotary turret. The turret comprises a head 184 and a base member rigidly connected together and mounted to rotate about a stationary upright shaft 188 (see Fig. 1), the upper end of which is secured in the base 12. Antifriction rolls 190 carried by the support 178 insure free movement of the latter up and down the guide bar 182. A flexible cable or chain 192, one end of which is attached to the support 178, passes over a loose pulley 194 carried by the turret head and carries at its other end a piston 196 upon which the weight 180 is supported. The cumulative effect of the weight 180 and the piston 196 is sufficient to press upward with considerable force upon a stack of blanks supported on the shelf 178, thus maintaining such a stack of blanks continuously under pressure while the paste or cement is setting.

The weight 180 is bifurcated, as indicated at 198, and is guided in its vertical movements by a suitably disposed guide rod 200 mounted upon the turret. When a stack of blanks is removed from one of the supports 178 and the support is released, as will presently be described, the piston 196 and weight 180 descend rapidly and, for the purpose of absorbing the shock, when the support has reached the upper limit of its movement, a dash pot 202 is provided in the turret base. As the piston 196 approaches the end of its descent it enters the dash pot and comes to rest gradually.

It will be understood from the drawings that six of these stack holding and pressing mechanisms such as that just described are supported in the turret. By this means the blanks may be kept stacked under pressure for a sufficient length of time to permit the paste or cement to set securely before the blanks are ejected from the machine.

The mechanism for rotating the turret intermittently at proper times to present the stack holders successively in position to receive blanks will next be described.

Figure 4:
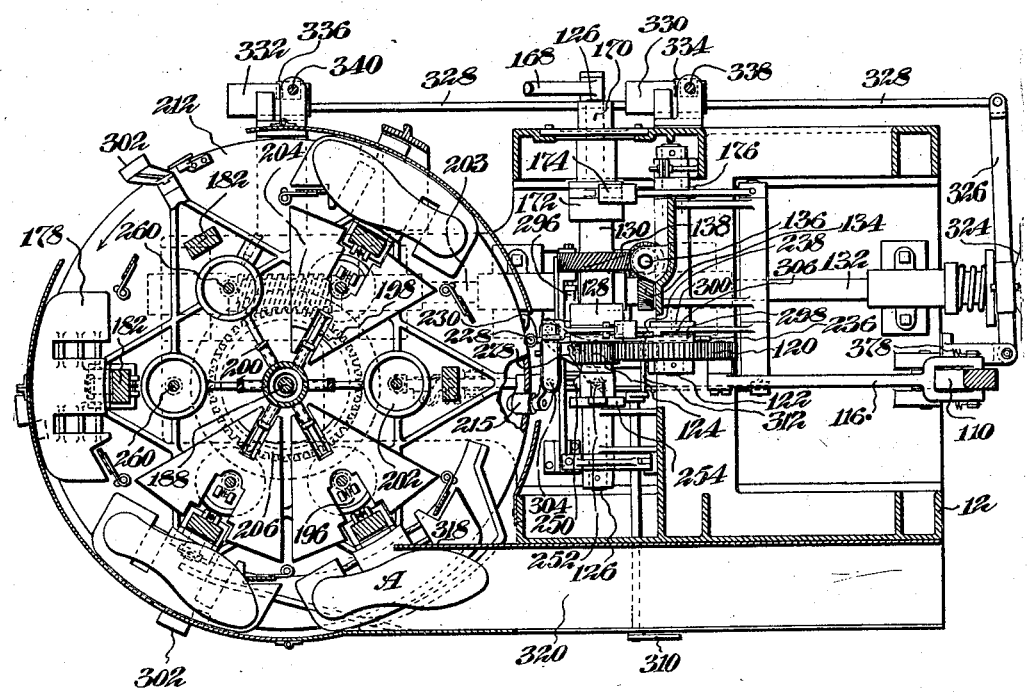
Fig. 4 is a plan view taken on the line 4—4 of Fig. 1.

A shaft 203 carries a worm 204 (see Fig. 4) which meshes with, and drives, a worm gear 206 mounted to rotate about the vertical shaft 188, a friction cone 208 is formed integrally with the worm gear 206 and a complemental conical member 210 projecting from the under side of the turret base 186 rests upon the cone 208, in frictional driving engagement therewith. When the worm gear 206 is rotated it thus exerts rotative force on the turret, which will rotate about its vertical axis unless it is held against rotation. The shaft 203 is driven from the driving shaft 132 through a Horton clutch 296, controlled by a stop arm 288 operated by mechanism presently to be described.

Suitable additional locking and releasing mechanism is provided for controlling the rotative movement of the turret and timing it to occur at the proper times. A flange 212 projecting downwardly from the turret base is provided with a plurality of recesses or notches 214 equal in number to the number of blank stack holders, in this instance six. A locking roll 215 is arranged to enter any one of the recesses 214 and to hold the turret against rotation though the worm gear 206 continue to turn. The roll 215 is carried by an upwardly projecting arm 216 upon a lever 218 pivotally mounted at 220 in a stationary bracket 222. A spring 224 secured to the lever 218 and to the base of the machine tends to keep the roll 215 in the notch 214 until it is retracted by other means.

To the end that the locking roll 215 may be automatically retracted and rotary movement of the turret permitted when a stack of blanks has accumulated upon the support 178, the support is provided with a lug 226 which, when the support 178 descends sufficiently, engages a yielding pin 228 mounted in the end of a lever 230 which is movable about a stationary pivot 232 and is normally held up by a spring 234. When the lug 226 strikes the pin 228 the lever 230 will be rocked downwardly against the tension of the spring 234, throwing an upright arm 236 of the lever toward the left, as viewed in Fig. 1. A latch 238 is pivoted to the lever arm 236 and normally held by a spring 240 against an abutment projecting therefrom. A lug 242 upon the rocker arm 244 normally rests upon a projection upon the side of the latch 238, as shown in dotted lines in Fig. 1, maintaining the arm 244 elevated and the depending rocker arm 246, rigidly connected thereto, thrown toward the left.

When the lever 230, 236 is rocked, as above described, the latch 238 is moved from beneath the lug 242, permitting the rocker arms 244, 246 to move in a counter clockwise direction. To the lower end of the arm 246 is pivoted a connecting link 248 which is connected at its opposite end to a swinging arm 250, the lower end of which is pivoted to the lever 218. As the rocker arm 246 moves toward the right the arm 250 also swings toward the right until its upper end is directly beneath the lower end of a plunger 250, which is reciprocated vertically by an eccentric 254 upon the shaft 126. The arm 250 now being in the path of the plunger 252 will be engaged by the plunger during its next descent and the lever 218 will be depressed, retracting the locking roll 215 from the notch 214 and permitting the turret to start to rotate. A shield 256 is pivoted adjacent to each notch and drops across the notch as soon as the locking roll is retracted to prevent the possibility of the locking roll re-entering that notch.

A dog 258 pivotally mounted in the end of the lever 218 engages the lower end of a spring depressed rod 260 and raises the rod at the time that the locking roll 215 is retracted. The rod 260 serves as a vertical guide for the piston 196 and to operate a latch 262 which is pivoted to the turret head at 264. The point of the right hand latch 262 in Fig. 1 is shown engaged in a slot 266 formed in a slide member 268 guided for radial movement on the top of the turret head 184. Each sliding member 268 carries a pair of fingers 270 which extend above the stack of soles when the slide 268 is projected by the springs 272. The die 154 is provided with slots 274 which the fingers 270 enter while the stack of blanks is held depressed by the plunger 152, thus preventing the stack from rising into engagement with the under side of the form 76 when the plunger rises after the projection of the fingers. From the preceding description it will be understood that when the rod 260 is raised the latch 262 will be withdrawn from the slot 266 and the slide 268 will be instantly projected until the fingers 270 are above the stack, acting as a retainer to prevent the latter from rising under the influence of the weight 180 while the turret rotates. The upward pressure of the support 178 due to the weight of the piston 196 and the weight 180 is, however, constantly exerted upon the stack until the blanks reach the last station in the path of rotation of the turret, where they are to be removed.

A bracket 278 is secured to the plunger 252 and supports a clevis 280, in which is swung a hook 282. A co-operating hook 284 is pivotally suspended at 286 from a clutch stop arm 288 pivotally mounted upon the machine base at 290. The hook member 284 has a slot 292 in which a pin 294 engages. The pin 294 is mounted in an extension of the link 248 and as the latter moves toward the right, as viewed in Fig. 1, the hook member 284, will be swung in the same direction until, upon the upward or return stroke of the hook plunger 252 it will be engaged by the hook 282 and the clutch stop arm 288 raised. This will permit the clutch 296 to engage, thus connecting the worm 204 to the driving shaft 132 and starting the rotation of the turret in the direction indicated by the arrow in Fig. 4.

The lever arms 236 and 244 are restored respectively by cams 298, 300 upon the shaft 122. As the shaft 122 rotates the cam 300 acts at the proper time to rock the arms 244, 246 in a clockwise direction and the cam 298 rocks the arm 236 in the same direction, causing the latch 238 to engage beneath the lug 242 and support it. The return movement of the link 248 rocks the arm 250 to the left out of the path of the plunger 252, permitting the locking roll 215 to rise until it is stopped by engagement with the lower edge of the flange 212 and the hook member 284 is moved in the same direction until the hooks 284 and 282 are disengaged.

The rotation of the turret will continue until the next notch 214 reaches the locking roll 215 which will enter the notch and stop the turret with the next stack support 178 beneath the form. Cams 302 are mounted on the turret in such relation to the notches 214 that as the turret comes to rest one of the cams engages a roll on the lower end of a rod 304 which is connected to a clutch stop arm 306 controlling the clutch 128 which connects the shaft 130 to the shaft 126.

Figure 9:
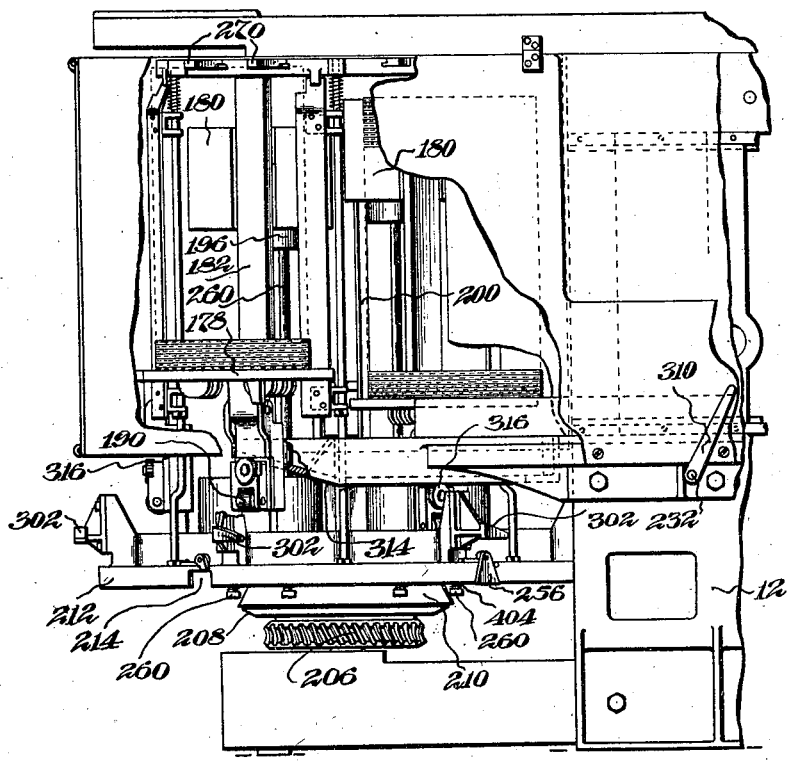
Fig. 9 is a partial front elevation of one end of the machine with portions broken away to reveal the interior construction.

A rocker arm 308 operated by a handle 310 at the front of the machine and provided with a pin 312 engaging the arm 236 may be actuated to release the turret to bring the stacks of blanks successively to discharging position when it is desired to empty the machine. A stationary cam 314, (see Fig. 9) is arranged to be engaged by a cam roll 316 carried by each stack support 178 when the latter approaches the blank discharging station. As the roll 316 rides upon the cam 314 the support 178 is lowered sufficiently to release the stack of blanks from pressure and permit them to be removed. The removal of the stack of blanks is accomplished automatically by the engagement of the stack with a vertical wall 318 (see Fig. 4) which extends into the path of movement of the stack of holders in the turret. As each stack of blanks reaches the discharging position indicated by A in Fig. 4, the stack is deflected into a stationary trough 320, from which it may be removed. After passing the blank discharging station the roll 316 passes off the cam 314 permitting the support 170 to rise and assume a position ready to begin the formation of a new stack.

Power for operating the machine, except the presser foot 42, is derived from a pulley 322 connected to the driving shaft 132 by a clutch 324. The engagement and disengagement of the clutch are controlled by a clutch shipping lever 326 operated by a horizontal rod 328 which carries wedge blocks 330, 332 co-operating respectively with wedge blocks 334, 336 secured to upright rods 338, 340. The upper ends of the rods 338, 340 are connected respectively to operating levers 342, 344 pivotally mounted at 346, 348 and provided with handles 350, 352. Movement of either of the handles up or down will, through the connections described, engage or disengage the clutch 324.

As a means for automatically disengaging the clutch and stopping the machine in the event of exhaustion of the supply of blanks in one of the magazines, the following mechanism is provided: The rod 338 has connected to it a spring 354 supported upon a stationary bracket 356 and tending to raise the rod 338 and thus disengage the driving clutch. A latch 358 formed as one arm of a bell crank lever pivoted in the bracket 356 at 360 engages a squared pin 362 at the upper end of the rod 338 when the latter is depressed and a spring pressed pin 364 mounted in the other arm 366 of the bell crank lever maintains the engagement of the latch with the pin 362, locking the clutch in operative engagement but permitting its release by depression of the arm 366 which is accomplished by a finger 368 projecting from the plunger 48. The parts are so designed that this engagement occurs when the presser foot 42 has reached the bottom of the magazine, which it does when the supply of blanks in the magazine is exhausted.

The leather blanks which are fed from the magazine 18 are frequently quite thin, oftentimes being in the nature of skivings which are so soft and flexible that it is impracticable to feed them successfully from the bottom of a stack by a simple pusher engaging only their edges. To overcome this difficulty additional feeding mechanism is provided for operation in conjunction with this magazine.

The slide 38 has a cross bar 370 upon which a rocking frame 372 is supported. The frame 372 is provided with a long slot 374 through which the cross bar 370 passes and which permits the frame 372 both to slide longitudinally and to rock about the bar 370 as a fulcrum, relatively to the slide 38. The forward end of the frame 372 carries several toothed blank engaging fingers 376, the teeth being so disposed as to engage the under surface of the lowermost blank in the magazine 18 when the frame 372 is actuated in a certain way.

A spring 378 is connected at one end to the lever 110 and at the other end to the lower part of the frame 372 about midway of the length of the latter. Other springs 380 are secured at their inner ends to the machine frame and at their outer ends to a cross rod 382 mounted in the frame 372. The springs 380 are always under tension tending to move the frame 372 toward the left, as viewed in Figs. 1 and 5. When the feeding slide 38 is moved toward the extreme right to the position shown in Figs. 1 and 7 the cross bar 370 engages the end of the slot 374, moving the frame 372 toward the right until the fingers 376 are approximately beneath the stack of blanks in the magazine 18. When the parts are in this position the spring 378 rocks the inner end of the frame 372 downwardly about the cross bar 370 as a fulcrum, keeping the fingers 376 out of engagement with the lowermost blank in the magazine. When the slide 38 starts to move toward the left a lug 384 projecting from the lower side of the frame 372 engages a shoulder 386 upon a stop member 388, which is movable about a stationary pivot 390 and is under the influence of a spring 392 tending to draw it upwardly. As the slide 38 proceeds, the cross bar 370 passes a point directly above the connection of the spring 378 to the frame 372, whereupon the tension of the spring causes the frame to rock about the shifting fulcrum 370 in a direction to cause the fingers 376 to engage and bite into the under surface of the lowermost blank in the pile contained in the magazine 18. As the slide 38 proceeds still further and approaches the left hand limit of its movement a cam roll 394 upon the lever 110 engages a cam surface 396 upon the stop member 388, depressing the latter against the tension of the spring 392 until the lug 384 is released from engagement with the shoulder 386 and the frame 372 is snapped suddenly toward the left by the springs 380 until it is stopped by engagement of the lug 384 with a spring buffer 398, the parts now being in the position illustrated in Fig. 8.

The engagement of the lower face of the blank by the numerous sharp pointed teeth upon the fingers 376 and the sudden movement of the fingers in the direction of feed of the blank combine to start the lowermost blank from the stack with great certainty and precision even though the blank be quite thin and soft and of such a character as to be easily crumpled. By the toothed fingers 376 the blank is thus displaced laterally from beneath the stack sufficiently to permit it to be fed easily through the remaining distance to the form 76 by the pushers 36. As the slide 38 starts its reverse movement the frame 372 is held against the buffer 398 by the springs 380 until after the cross bar 370 has passed a point above the attachment of the upper end of the spring 378, whereupon the spring will cause the frame 372 to rock in a counter clockwise direction about the bar 370, removing the fingers 376 from engagement with the blank; and the bar 370 will eventually engage the end of the slot 374, retracting the frame 372 to the initial position shown in Fig. 1.

Upon the next advancing movement of the pushers 36 their ends will engage the previously discharged blank and push it forward through the cementing mechanism to the form, the timing of the parts being such that the blank is completely removed from the magazine before the fingers 376 are rocked upwardly to engage the next blank.

Each slide member 268 must be retracted after the delivery of the corresponding stack of blanks from the turret, in order to remove the fingers 270 from the path of the die 154, to permit the accumulation of a fresh stack of blanks on the support 178. To this end the slide member 268 is provided with a cam roll 400 arranged to cooperate with a stationary cam 402. The cam 402 is so disposed that it withdraws the slide, against the tension of the springs 272, during the movement of the stack holding device between the stack discharging position and blank receiving position. As soon as the slide 268 is sufficiently retracted the latch 262 is caused by a spring 404 at the lower end of the rod 260 to enter the slot 266 and retain the slide in retracted position after the roll 400 passes off the cam 402.

While the construction and operation of the various parts of the machine have been described in detail a clear understanding of the machine as a whole will be facilitated by a brief review of such operation at this point.

Let it be assumed that the magazine 16 is supplied with leatherboard blanks and the magazine 18 with leather blanks and that the machine is at rest with the slide 38 at the left hand limit of its movement when viewed as in Fig. 1. The hand levers 64 are moved to mesh the appropriate gears which, acting through the friction devices 54, will cause the presser feet 42 to exert downward pressure upon the piles of blanks in the magazines. The driving clutch 324 is next engaged by lifting the handle 350 until the latch 358 engages the squared pin 362.

Power is now transmitted from the driving shaft 132 through the upright shaft 136 to the shaft 130 and thence through the clutch 128 to the shaft 126 and finally to the gear 120. The rotation of the gear 120, through the connections 116, 110, 114, causes the slide 38 to be moved toward the right, together with the pusher 34 and the rods 150. The pusher 34 feeds out the lowermost blank from the magazine 16 and deposits it in the form 76 where it rests upon the rods 150. Upon the return stroke of the slide 38 the feed mechanism which co-operates with the blank magazine 18 feeds the lowermost leather blank from that magazine over the cementing roll 90 and deposits it upon the previously deposited leather board blank in the form 76. During this movement the rods 150 have been retracted and the clutch 172 is now engaged, causing the crank 170 to turn through one revolution which lowers and raises the plunger 152. As the plunger 152 descends, the die 154 presses the two layers through the form 76, which expands to permit the assembled blank to pass and again contracts immediately after the blank has passed through the form. The extent of movement of the die 154 is sufficient to press the blank down upon the support 178, which yields the necessary distance. As the plunger and die 154 again rise the blank is forced upwardly against the under side of the form 76, which it strikes with a blow.

This operation is repeated until a sufficient number of blanks is accumulated upon the support 178 to cause the lug 226 to strike the pin 228. This operates mechanism previously described to disengage the clutch 172 and thus stop the operation of the plunger 152, which is driven through the said clutch. The clutch 128 is also disengaged, stopping the operation of the feed slide 38; the locking roll 215 is lowered, releasing the turret; and the clutch 296 is engaged, starting the rotation of the turret. Simultaneously with the retraction of the locking roll 215 the latch 262 operates to release the slide member 268 and the fingers 270 are projected to a position over the stack of blanks upon the support 178. The time relation of the operations just referred to is such that the projection of the fingers 270 occurs while the plunger 152 is at the bottom of its last downward stroke, the fingers entering the slots 274 in the die 154. The die then rises and comes to rest in its elevated position where it will not interfere with the rotation of the turret.

The rotation of the turret continues through one sixth of a revolution, whereupon, the locking roll 215, pushing the shield 256 aside, enters the next notch 214 in the turret and arrests its rotation with the next support 178 in position to receive the first blank of a new stack. When the turret comes to rest the clutch 296 is automatically disengaged, disconnecting the power from the turret rotating worm 204 and the clutches 128 and 172 are engaged, with the result that the operation of the feed slide 38 and the plunger 152 is resumed.

This method of operation proceeds indefinitely as long as the magazines 16, 18 are kept supplied with the blanks; a stack of finished soles being released and delivered into the trough 320 at each step in the rotation of the turret.

It will be understood that in the use of the illustrated machine the operator's only duties are to maintain a supply of paste or cement in the tank 88 and a supply of blanks in the magazines 16 and 18; the proper adjustments having been made for any given blank being assembled, no further attention to the machine is required than to keep it supplied with material and furthermore the machine will stop automatically in the event of the exhaustion of the supply of blanks in the magazine 18.

While the automatic stop mechanism has been illustrated in connection with the magazine 18, it will be understood that this illustration is typical and that such mechanism may be duplicated in connection with the similar magazine 16.

Having described the invention, what is claimed as new and desired to be secured by Letters Patent is:—

1. A blank assembling machine comprising, in combination, power operated mechanism for assembling pieces of material into blanks, and a plurality of holders each constructed and arranged to receive directly from said assembling mechanism a plurality of said blanks piled one upon another.

2. A blank assembling machine comprising, in combination, power operated mechanism for assembling pieces of material into blanks, and a plurality of holders each constructed and arranged to receive directly from said assembling mechanism a plurality of said blanks piled one upon another and hold them continuously under pressure.

3. A blank assembling machine comprising, in combination, mechanism for assembling pieces of material into blanks, a plurality of holders each constructed and arranged to receive a plurality of said blanks piled one upon another, and means for moving the holders successively into position to receive blanks directly from the assembling mechanism.

4. In a blank assembling machine, the combination of mechanism for assembling layers of material into sole blanks, a plurality of holders movable successively into position to receive assembled blanks from the assembling mechanism, each of said holders being constructed and arranged to receive in succession a plurality of blanks piled one upon another, and means operating automatically to move one holder from blank receiving position when it is filled and another holder into blank receiving position.

5. In a blank assembling machine, the combination of mechanism for assembling layers of material into sole blanks, a rotary turret, a plurality of holders upon the turret each constructed and arranged to receive a plurality of assembled blanks piled one upon another, and means operating in timed relation to the blank assembling mechanism for intermittently rotating the turret to move the holders successively into position to receive blanks from the assembling mechanism.

6. In a machine of the class described, the combination of a plurality of holders movable successively to a blank receiving position, mechanism for assembling layers of material into sole blanks outside of said holders and inserting the assembled blanks successively into that holder which is in receiving position and maintaining them under pressure in said holder until said holder is filled, and means for removing the filled holder, with the blanks under pressure, from receiving position and for moving the next holder to receiving position.

7. In a blank assembling machine, the combination of blank assembling mechanism including an expansible form and a die for pressing an assembled blank through the form, and means for exerting pressure upon the assembled blank against the face of the form from which the blank emerges, in a direction opposite to that in which the blank passes through the form.

8. In a machine of the class described, the combination of a blank assembling form, a die for pressing an assembled blank through the form, a support arranged to receive the blank after it has passed through the form, and means for moving the support suddenly toward the form to press the blank sharply against the face of the form.

9. In a machine of the class described, the combination of a blank assembling form, a blank support beneath the form, counterbalancing means for the blank support tending to move the latter toward the form, and a die constructed and arranged to press a blank through the form upon the support, the movement of the die being sufficient to depress the upper face of the blank below the lower face of the form.

10. In a machine of the class described, the combination of a depressible blank support constructed and arranged to support a stack of blanks, mechanism for adding blanks to the top of the stack one at a time and thus progressively lowering the support, and a stack retainer arranged to be projected across the top of the stack when the latter is completed.

11. In a machine of the class described, the combination of a downwardly yieldable blank support constructed and arranged to support a stack of blanks in superposed relation, a counter-balance tending always to elevate the support, mechanism for accumulating a stack of blanks upon the support by successive additions to the top of the stack, and a retainer operative when the stack is completed to hold the stack of blanks under the pressure produced by the counter-balance.

12. In a machine of the class described, the combination of a support constructed and arranged to hold a stack of superposed blanks, mechanism for adding blanks to the stack, a retainer for retaining a stack of blanks upon the support, means for holding the retainer retracted in inoperative position while blanks are being added to the stack, and means for automatically projecting the retainer into operative position when the stack reaches a predetermined height.

13. In a blank assembling machine, a form having a blank-shaped opening therein, supporting means arranged to be projected through the form across the opening, means for depositing a blank upon said supporting means, and means for thereafter withdrawing the supporting means to permit the blank to pass through the opening in the form.

14. In a blank assembling machine, the combination of an expansible blank assembling form having an opening smaller than the blank to be produced, supporting means arranged to be projected across the opening, assembling mechanism for assembling a blank upon the supporting means, said supporting means insuring a correct initial position of the blank in the form, means for withdrawing the supporting means, and means for thereafter pressing the assembled blank through the form.

15. In a machine of the class described, a turret provided with a plurality of holders for holding stacks of blanks, means for rotating the turret intermittently to bring the holders successively into blank receiving position, means for inserting a plurality of blanks in succession into each holder while it is in receiving position, means for discharging a stack of blanks from the holder just prior to the arrival of the latter in blank receiving position, and means for maintaining the accumulating stack of blanks under pressure throughout the period of their insertion in the holder and the movement of the holder from blank receiving position to blank discharging position.

In testimony whereof I have signed my name to this specification.

THOMAS LUND.